(12) United States Patent
Ishidoya

(10) Patent No.: US 7,038,220 B2
(45) Date of Patent: May 2, 2006

(54) DOSE DISTRIBUTION READING METHOD AND READER FOR GLASS DOSIMETER

(75) Inventor: Tatsuyo Ishidoya, Haibara-gun (JP)

(73) Assignee: Asahi Techno Glass Corporation, (JP)

( * ) Notice: Subject to any disclaimer, the term of this patent is extended or adjusted under 35 U.S.C. 154(b) by 0 days.

(21) Appl. No.: 11/068,274

(22) Filed: Feb. 28, 2005

(65) Prior Publication Data

US 2005/0218339 A1  Oct. 6, 2005

Related U.S. Application Data

(63) Continuation of application No. PCT/JP02/13225, filed on Dec. 18, 2002.

(30) Foreign Application Priority Data

Sep. 2, 2002 (JP) ............................. 2002-256917

(51) Int. Cl.
*G01N 21/35* (2006.01)

(52) U.S. Cl. .................................................. 250/484.2
(58) Field of Classification Search ............. 250/484.2, 250/483.1, 472.1
See application file for complete search history.

(56) References Cited

U.S. PATENT DOCUMENTS

| 5,057,693 | A | 10/1991 | Burgkhardt et al. |
| 5,059,806 | A | 10/1991 | Burgkhardt et al. |
| 6,307,212 | B1 | 10/2001 | Huston et al. |

FOREIGN PATENT DOCUMENTS

| JP | 50-5595 | 3/1975 |
| JP | 3-102283 | 4/1991 |
| JP | 3-102284 | 4/1991 |
| JP | 5-60866 | 3/1993 |
| JP | 5-119155 | 5/1993 |
| JP | 05-119155 | 5/1993 |
| JP | 06-138235 A | * 5/1994 |
| JP | 08-220235 | 8/1996 |
| JP | 3014225 | 12/1999 |

OTHER PUBLICATIONS

International Search Report from corresponding PCT patent application.
International Preliminary Examination Report from corresponding PCT application.
English Translation of International Preliminary Examination Report for corresponding PCT application.

* cited by examiner

*Primary Examiner*—David Porta
*Assistant Examiner*—Marcus Taningco
(74) *Attorney, Agent, or Firm*—Harness, Dickey & Pierce, P.L.C.

(57) ABSTRACT

To excite a fluorescence glass element to which radiation is applied with ultraviolet rays and to read a dose by a fluorescence intensity generated from a fluorescence detection surface of the fluorescence glass element, a method comprises a fluorescence intensity measurement step of using a two-dimensional camera as a detection unit which detects the fluorescence intensity from the fluorescence glass element and measuring the fluorescence intensity for each pixel division comprising one or a plurality of pixels set beforehand, a step of converting the fluorescence intensity measured for each pixel division into the dose, and a step of outputting the dose of each pixel division and a dose distribution.

20 Claims, 6 Drawing Sheets

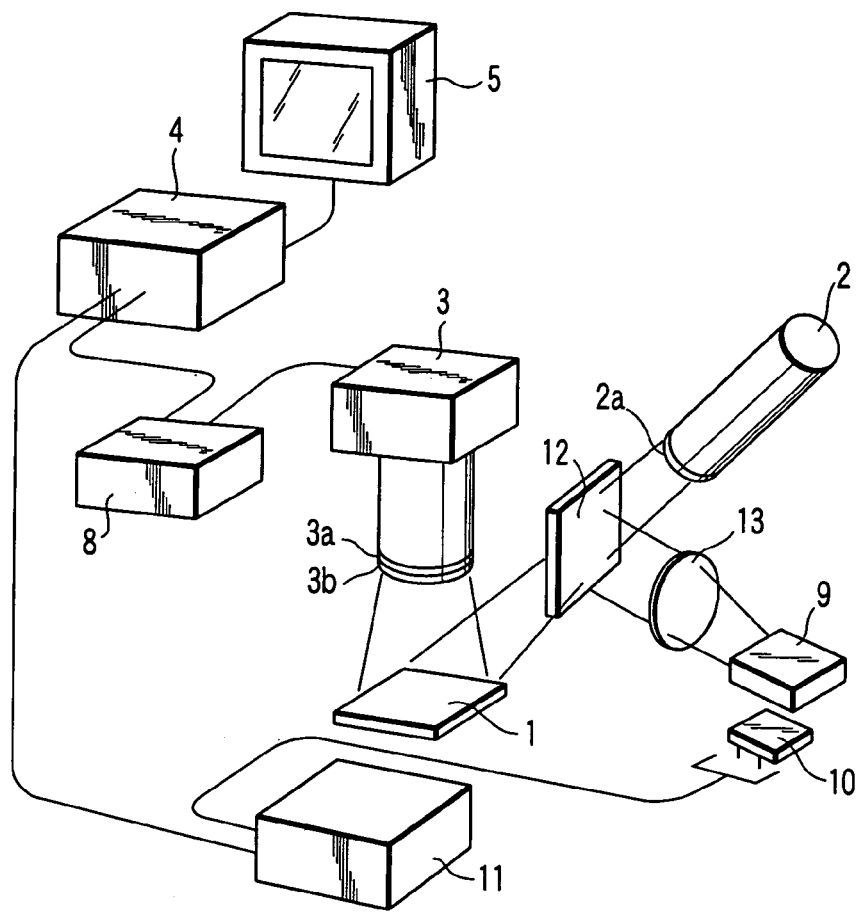
F I G. 5
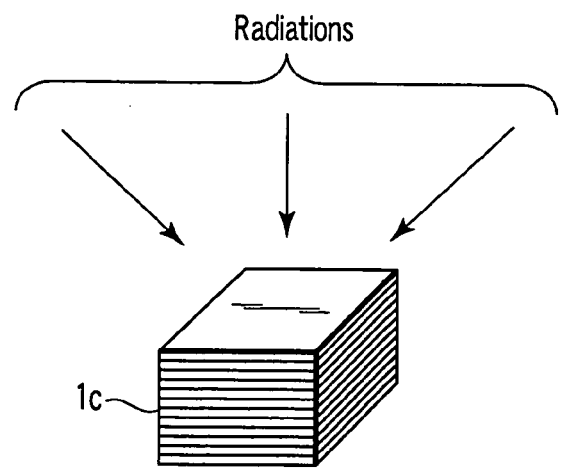
F I G. 7

DOSE DISTRIBUTION READING METHOD AND READER FOR GLASS DOSIMETER

CROSS-REFERENCE TO RELATED APPLICATIONS

This is a Continuation Application of PCT Application No. PCT/JP02/13225, filed Dec. 18, 2002, which was published under PCT Article 21(2) in Japanese.

This application is based upon and claims the benefit of priority from prior Japanese Patent Application No. 2002-256917, filed Sep. 2, 2002, the entire contents of which are incorporated herein by reference.

BACKGROUND OF THE INVENTION

1. Field of the Invention

The present invention relates to a dose distribution reading method and reader for a glass dosimeter, in which a two-dimensional or three-dimensional dose and dose distribution of the glass dosimeter are simultaneously read using a two-dimensional camera.

2. Description of the Related Art

In recent years, radiation therapy devices such as a gamma knife and a cyber knife have been used in radiation therapy. These radiation therapy devices utilize, a narrow beam gamma ray, which needs to be correctly applied to a lesion part in a concentrated manner. Therefore, it is important to perform inspections such as CT and MRI before performing the therapy and to correctly confirm a radiation dose or an irradiation position.

Additionally, the lesion part to which the radiation therapy is applied is a part in which a surgical operation is difficult, such as the inside of skull, and therefore it has been difficult to confirm an actual beam profile and an irradiation dose. At present, a film photosensitive to gamma rays has been used in this type of irradiation dose measurement. However, this type of film is not suitable for high-dose measurement in which concentrated irradiation is performed in the radiation therapy, and there have been disadvantages that the distribution is observable but a correct dose measurement is not possible.

Moreover, in recent years, a radio chromic film called Gafchromic has been used. In this film, a photosensitive function is not used as in a silver salt film, but a discoloration function (change to blue) which is proportional to an ionizing radiation dose is used, and there is an advantage that developing in a darkroom is not required. However, this radio chromic film has problems in that sensitivity changes in accordance with a storage temperature, and it is not suitable for accurate dose measurement. Furthermore, it is expensive, cannot be reused, and is therefore economically disadvantageous.

On the other hand, a glass dosimeter has heretofore been known as a meter which has a high measurement precision and which is superior in cost. The glass dosimeter comprises a fluorescence glass element formed of phosphate glass containing silver ions. When the fluorescence glass element is activated by exposure to ionized radiation, and subsequently excited with ultraviolet rays, fluorescence is generated from a predetermined glass surface. Since fluorescence intensity is proportional to the exposure radiation dose, the radiation dose can be obtained from the fluorescence intensity.

The above-described glass dosimeter can be reused because it can be reset by thermal treatment, correct measurement is possible even for high doses, and therefore application to the above-described radiation therapy device is considered. In one of the considered use modes of the glass dosimeter in radiation therapy, the fluorescence glass element is disposed in an irradiation position of the radiation therapy device such as the gamma knife or the cyber knife (position where the lesion part is to be present during the therapy), radiation is performed, and it is confirmed whether or not a predetermined dose is applied to an irradiation position obtained from inspections such as CT and MRI beforehand.

As a concrete example of a conventional glass dosimeter, there is a dosimeter disclosed in Jpn. Pat. Appln. KOKAI Publication No. 3-102283. This has been developed for the purpose of obtaining a radiation quality and an incident direction of radiation in a personal dosimeter from the standpoint of exposure accident analysis, and a fluorescence detection position (or area) is changed by a diaphragm to detect the fluorescence. The incident direction is estimated by the use of characteristics that a peak position of an exposure dose deviates in accordance with the incident direction by the use of a dosimeter element having a slit in its middle (filter absence portion) as shown in FIG. 26 of the publication (fluorescence intensity distribution known with a dosimeter having this structure is a one-dimensional distribution). As this device is used for whole body exposure, and not for narrow beam irradiation, correct dose distribution measurement, which is an object of the present invention, is impossible.

Moreover, a radiation dose reader capable of detecting a fluorescence intensity distribution is described in Japanese Patent No. 3014225. In this reader, area sensors such as CCDs are used in a fluorescence detector in the dose reader for the purpose of estimating the radiation incident direction from the position of a fluorescence peak in the glass device in which a filter is disposed in the same manner as in the Jpn. Pat. Appln. KOKAI Publication No. 3-102283. Additionally, it is impossible to obtain a sufficient sensitivity with the CCD camera at the time of the filing of the application. Therefore, the reader is constituted in such a manner that the detector is brought into close contact with the glass device (Claim 1 of the publication) and that an electronic multiplier plate is disposed between the detector and the glass device (Claim 2 of the publication), and it has been difficult to obtain a fluorescence intensity distribution fine enough to correspond to a pixel of the CCD.

Further, in Jpn. Pat. No. 3057168, a technique is described in which a fluorescence intensity fluctuation by an output fluctuation of an ultraviolet excitation light source is corrected in a fluorescence glass dosimeter measurement apparatus using a nitrogen gas laser as a light source, but this technique relates to the fluctuation correction of a total amount of exciting ultraviolet radiation received by the fluorescence glass element.

However, the above-described technique has the following problem. That is, since only the total amount of the fluorescence intensity is detected by a photomultiplier tube or the like in the conventional glass dosimeter, two-dimensional and three-dimensional dose distributions cannot be read, and it has been impossible to obtain the irradiation range and radiation dose by the radiation therapy device. Even when the radiation incident direction can be estimated, the filter has to be also used in the fluorescence glass element, and it has not been possible to read the dose distribution for narrow beam irradiation, which is an object of the present invention. Especially, since the fluorescence glass element usually has a thin plate or film form, it is difficult to securely set the device on a plane including a beam concentrated point. Therefore, there has been a demand for development of a technique capable of reading a three-dimensional dose distribution to obtain the dose and dose distribution at the point where the beam is concentrated, and its periphery.

BRIEF SUMMARY OF THE INVENTION

An object of the present invention is to provide a dose distribution reading method and a reader for a glass dosimeter, in which two-dimensional, three-dimensional doses and dose distributions of the glass dosimeter can be read to confirm whether or not a predetermined quantity of radiation has been applied to a predetermined position with high precision and, therefore contribute to the enhancement of reliability of radiation therapy.

According to the first aspect of the present invention, there is provided a radiation dose reading method for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reading method for the glass dosimeter, comprising:

using a two-dimensional camera as a detection unit which detects the fluorescence intensity from the fluorescence glass element;

a fluorescence intensity measurement step of measuring the fluorescence intensity for each pixel division comprising a preset pixel or a plurality of pixels;

a step of converting the fluorescence intensity measured for each pixel division into the dose; and a step of outputting the dose and dose distribution for each pixel division.

The ninth aspect of the present invention relates to an apparatus according to the first aspect of the present invention and there is provided a radiation dose reader for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reader for the glass dosimeter, comprising:

a two-dimensional camera as a detection unit which detects the fluorescence intensity from the fluorescence glass element;

a fluorescence intensity measurement section which measures the fluorescence intensity for each pixel division comprising a preset pixel or a plurality of pixels;

a dose calculation section which converts the fluorescence intensity measured for each pixel division into the dose; and a dose distribution output section which outputs the dose and dose distribution for each pixel division.

According to the inventions of the first and ninth aspects, the one-dimensional dose and dose distribution of the glass dosimeter can be simultaneously read by the use of the two-dimensional camera. Therefore, it is possible to confirm the irradiation position and quantity of radiation with a high precision, and reliability of radiation therapy can be enhanced.

According the second aspect of the present invention, there is provided a radiation dose reading method for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reading method for the glass dosimeter, comprising: using a two-dimensional camera as a detection unit which detects the fluorescence intensity from the fluorescence glass element; a fluorescence intensity measurement step of changing an incident position of the ultraviolet rays in a thickness direction of the fluorescence glass element to apply ultraviolet rays shaped like a thin layer from a side surface other than the fluorescence detection surface of the fluorescence glass element, and measuring the fluorescence intensity in each irradiation position for each pixel division using the two-dimensional camera; and a three-dimensional data output step of synthesizing a plurality of data measured by changing the incident position of the ultraviolet rays to output a three-dimensional dose and a three-dimensional dose distribution of the fluorescence glass element.

The eleventh aspect of the present invention relates to an apparatus according to the second aspect of the present invention and there is provided a radiation dose reader for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reader for the glass dosimeter, comprising:

a two-dimensional camera as a detection unit which detects the fluorescence intensity from the fluorescence glass element;

a fluorescence intensity measurement section which changes an incident position of the ultraviolet rays in a thickness direction of the fluorescence glass element to apply ultraviolet rays shaped like a thin layer from a side surface other than the fluorescence detection surface of the fluorescence glass element and which measures the fluorescence intensity in each irradiation position using the two-dimensional camera; and a three-dimensional data output section which synthesizes a plurality of data measured by changing the incident position of the ultraviolet rays to output a three-dimensional dose and a three-dimensional dose distribution of the fluorescence glass element.

According to the inventions of the second and eleventh aspects, the fluorescence intensity for each pixel division is measured using the two-dimensional camera, further the incident position of the ultraviolet ray is changed in a thickness direction of the fluorescence glass element to obtain a plurality of measured values for each pixel division, and therefore the three-dimensional dose and dose distribution in the glass dosimeter can be read. Therefore, it is possible to exactly grasp the dose and dose distribution in the beam concentrated point and peripheral portion. Accordingly, the irradiation position or quantity of radiation can be correctly confirmed, and the reliability of radiation therapy can be enhanced.

According to the third aspect of the present invention, there is provided the dose distribution reading method for the glass dosimeter according to the second aspect, wherein a glass block is used as the fluorescence glass element, and the fluorescence intensity measurement step comprises: scanning the ultraviolet rays shaped like a thin layer in a vertical direction with respect to the glass block to measure the fluorescence intensity of each irradiation position.

According to the fourth aspect of the present invention, there is provided the dose distribution reading method for the glass dosimeter according to the second aspect, wherein a plurality of stacked thin glass plates are used as the fluorescence glass element, and the fluorescence intensity measurement step comprises: applying the ultraviolet rays shaped like a thin layer to each of the thin glass plates to measure the fluorescence intensity of each thin glass plate.

According to the inventions of the third and fourth aspects, it is possible to read the three-dimensional dose and dose distribution in the glass dosimeter comprising a block-shaped glass or a plurality of stacked thin glass plates.

According to the fifth aspect of the present invention, there is provided the dose distribution reading method for the glass dosimeter according to any one of the second to fourth aspects, further comprising: moving the fluorescence glass element to change the incident position of the ultraviolet rays.

The twelfth aspect of the present invention relates to an apparatus according to the fifth aspect of the present invention and there is provided the dose distribution reader for the glass dosimeter according to the eleventh aspect, further comprising: a sliding mechanism which moves the fluorescence glass element in a vertical direction or a right/left direction.

According to the inventions of the fifth and twelfth aspects, since the fluorescence glass element is moved when changing the irradiation position of the ultraviolet ray, a light path of the exciting ultraviolet ray does not change. Therefore, a shift of the light path with an elapse of time can be suppressed. Since a fluorescence generated position does not change, a focal point of the two-dimensional camera does not have to be moved, and stable measurement is possible.

According to the sixth aspect of the present invention, there is provided a radiation dose reading method for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reading method for the glass dosimeter, comprising:

using a two-dimensional camera as a detection unit which detects the fluorescence intensity from the fluorescence glass element;

using a plurality of stacked thin glass plates as the fluorescence glass element;

a fluorescence intensity measurement step of measuring the fluorescence intensity for each pixel division comprising a preset pixel or a plurality of pixels using the two-dimensional camera with respect to each of the thin glass plates;

a measured value storage step of storing a measured value of each thin glass plate; and a three-dimensional data output step of successively reading or synthesizing the stored measured values in a stacking order to output a three-dimensional dose and a three-dimensional dose distribution of the fluorescence glass element.

The tenth aspect of the present invention relates to an apparatus according to the sixth aspect of the present invention and there is provided the dose distribution reader for the glass dosimeter according to the nine aspect, further comprising:

a plurality of stacked thin glass plates which are used as the fluorescence glass element;

a measured value storage section which stores measured values of each of the thin glass plates; and a three-dimensional data output section which successively reads or synthesizes the stored measured values in a stacking order to output a three-dimensional dose and a three-dimensional dose distribution of the fluorescence glass element.

According to the above-described sixth and tenth aspects, the fluorescence intensity for each pixel division is measured using the two-dimensional camera. Moreover, the measured values of the thin glass plates are obtained plate by plate, and successively read in a stacking order, or synthesized, so that the three-dimensional dose and dose distribution in the glass dosimeter can be read. Therefore, in the same manner as in the second and eleventh inventions, it is possible to accurately grasp the dose and dose distribution in the beam concentrated point and peripheral portion, and the irradiation position or dose of radiation can be correctly confirmed. Since the three-dimensional dose and dose distribution can be read by the reading of each thin glass plate without any means for changing the incident position of the ultraviolet ray, it is possible to miniaturize the reader.

According to the seventh aspect of the present invention, there is provided the dose distribution reading method for the glass dosimeter according to any one of the first to sixth aspects, further comprising:

an ultraviolet intensity distribution measurement step of reading an intensity distribution of the ultraviolet rays using a reference glass dosimeter whose fluorescence glass element is uniformly irradiated with radiation; and a first correction step of correcting the dose and the dose distribution of a glass dosimeter which is a measurement object for each pixel division based on the intensity distribution of the ultraviolet rays obtained from the reference glass dosimeter.

The thirteenth aspect of the present invention relates to an apparatus according to the seventh aspect of the present invention and there is provided the dose distribution reader for the glass dosimeter according to any one of the ninth to twelfth aspects, further comprising:

a reference glass dosimeter whose fluorescence glass element is uniformly irradiated with the radiation; and a correction section which corrects the dose and the dose distribution of a glass dosimeter which is a measurement object for each pixel division based on an intensity distribution of the ultraviolet rays obtained from the reference glass dosimeter.

In the inventions according to the seventh and thirteenth aspects, first the intensity distribution of the ultraviolet ray which is the exciting light, and the dose and dose distribution for each pixel division of the glass dosimeter which is a measurement object are corrected based on the intensity distribution. Therefore, an influence by the intensity distribution of the ultraviolet ray can be securely removed from each pixel division, and more correct measurement of the fluorescence intensity is possible. Therefore, the dose and dose distribution for each pixel division can be read with the high precision, and the reliability is further enhanced.

According to the eighth aspect of the present invention, there is provide the dose distribution reading method for the glass dosimeter according to any one of the first to seventh aspects, further comprising:

a time fluctuation detection step of detecting a time fluctuation of intensity of the ultraviolet rays; and a second correction step of removing an influence of the detected time fluctuation from the dose and the dose distribution for each pixel division.

The fourteenth aspect of the present invention relates to an apparatus according to the eighth aspect of the present invention and there is provided the dose distribution reader for the glass dosimeter according to any one of the ninth to thirteenth aspects, further comprising:

a time fluctuation detection section which detects time fluctuation of intensity of the ultraviolet ray; and a second correction section which removes an influence of the time fluctuation detected in the time fluctuation detection section from the dose and the dose distribution for each pixel division.

In the invention according to the eighth and fourteenth aspects, the fluctuation of the intensity of the ultraviolet exciting light with time is obtained, and the dose and dose distribution for each pixel division of the glass dosimeter are corrected to remove the influence. Therefore, the measurement precisions of the dose and dose distribution for each pixel division can be enhanced in the same manner as in the seventh and thirteenth inventions.

BRIEF DESCRIPTION OF THE SEVERAL VIEWS OF THE DRAWING

FIG. 5 is a diagram showing an apparatus constitution of a third embodiment according to the present invention;

FIG. 7 is a main part constitution diagram of a fourth embodiment according to the present invention;

DETAILED DESCRIPTION OF THE INVENTION

Figure 1:
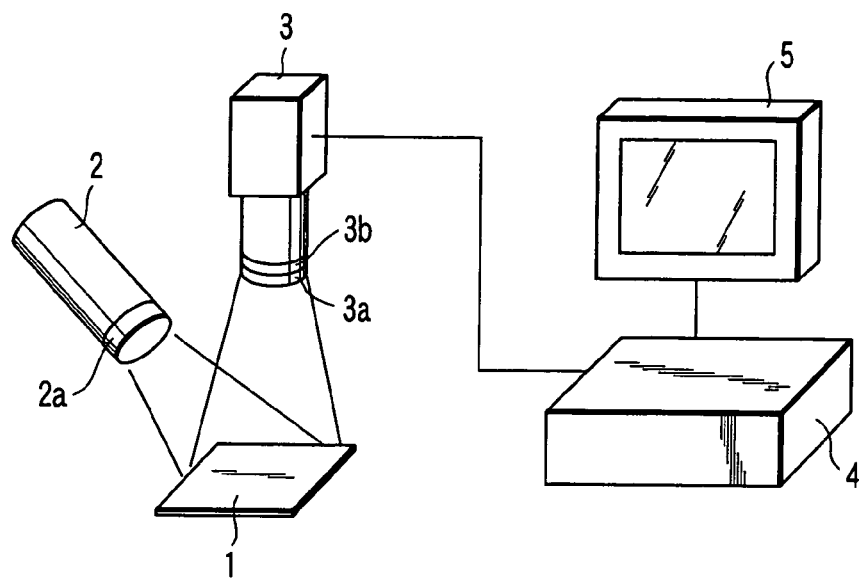
FIG. 1 is a diagram showing an apparatus constitution of a first embodiment according to the present invention.

An example of a mode for carrying out the present invention will be described concretely hereinafter with reference to the drawings. It is to be noted that members common to embodiments are denoted with the same reference numerals.

(1) First Embodiment

Figure 2:
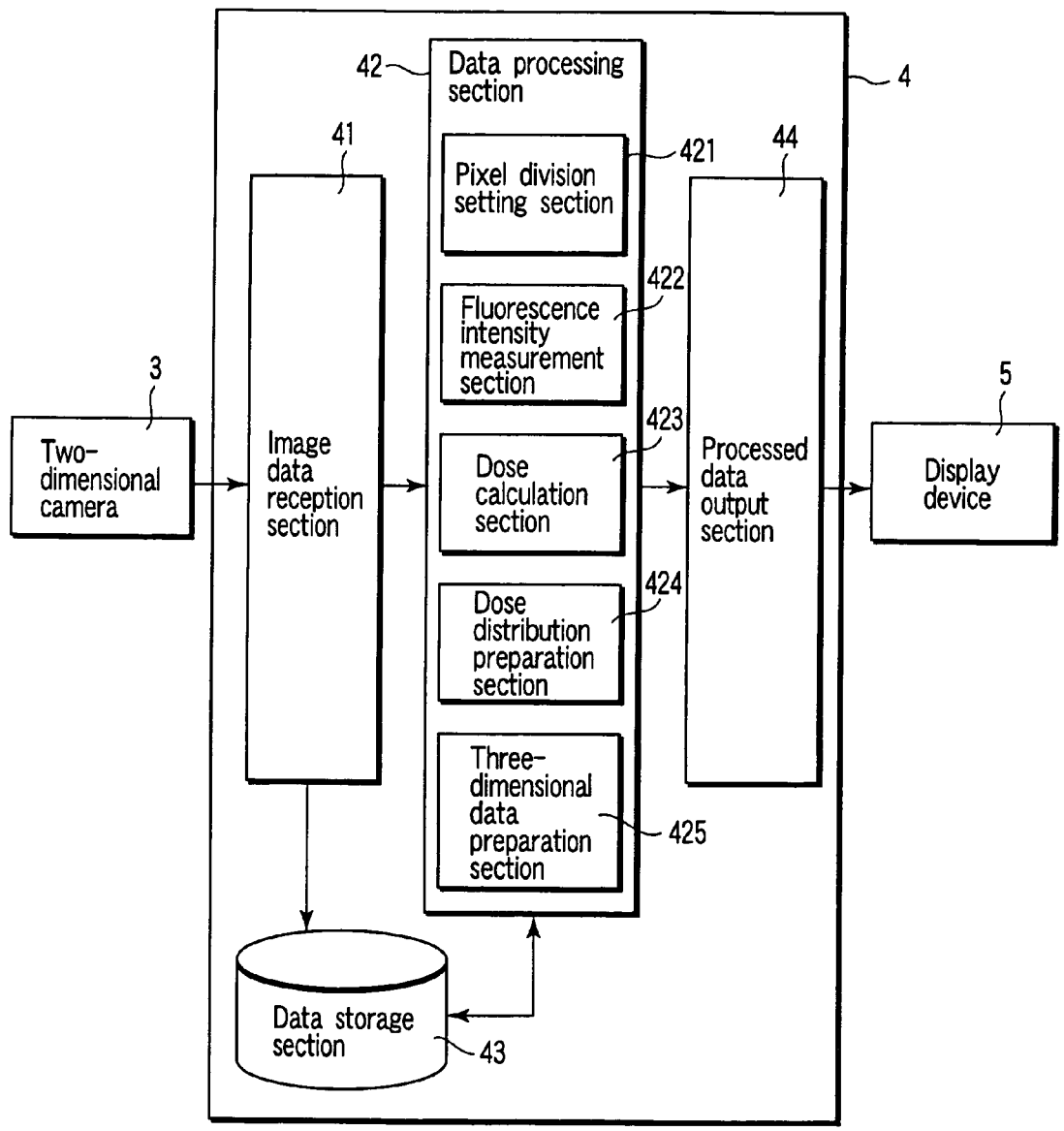
FIG. 2 is a functional block diagram showing a constitution of an image processing device of the first embodiment.

FIG. 1 is a diagram showing an example of an apparatus constitution of the present embodiment, and FIG. 2 is a functional block diagram showing a constitution of an image processing device of the present embodiment.

(1-1) Apparatus Constitution

In FIG. 1, reference numeral 1 denotes a glass dosimeter, 2 denotes an ultraviolet exciting light source, 3 denotes a two-dimensional camera, 4 denotes an image processing device, and 5 denotes a display device. The glass dosimeter 1 includes a fluorescence glass element. The fluorescence glass element is formed of a thin glass plate, whit a size of 30 mm×30 mm×1 mm, and about 100 mm×100 mm×1 mm at maximum. A diaphragm with a minimum width of 1 mm is attached to mask the whole periphery of a fluorescence detection surface of the fluorescence glass element. This prevents an edge portion of the glass element from becoming bright due to scattered light from the edge portion and from influencing the measured value. In this fluorescence glass element, when the exciting ultraviolet ray is applied from a fluorescence detection surface side, the diaphragm serves both as a mask for excitation and a mask for fluorescence detection.

A xenon flash lamp is used in the ultraviolet exciting light source 2. Since the xenon flash lamp includes light in a range of UV to infrared, a UV transmission filter 2a (transmitting only a wavelength of about 330 nm to 370 nm) is disposed on an exciting light incidence side. On a fluorescence detection side, that is, in an incidence port of the two-dimensional camera 3, a filter 3a (cutting the ultraviolet ray with about 380 nm or less here) which cuts the ultraviolet ray from the ultraviolet exciting light source 2, and a filter 3b (interference filter) which transmits only the fluorescence (wavelength of about 600 to 700 nm, or 600 nm or more) from the fluorescence glass element are disposed.

An object of the interference filter 3b is to transmit only the fluorescence (RPL) generated from the fluorescence glass element with good efficiency, and an object of the use of the ultraviolet cutting filter 3a is to prevent the fluorescence from being generated in a case where the ultraviolet ray strikes on the interference filter 3b or the lens.

An ultraviolet exciting method is constituted in such a manner that the exciting ultraviolet ray from the ultraviolet exciting light source 2 is applied from the fluorescence detection surface side of the fluorescence glass element, and is read by the two-dimensional camera 3 disposed in a direction crossing the surface at right angles.

A cooling type CCD camera (1344×1024 pixels, etc.) is used as the two-dimensional camera 3 for high doses, as for the gamma knife or the like. Since this cooling type CCD camera has low noise and high resolution, the distribution can be measured with a high precision, thus the camera is especially suitable for the measurement of high doses. Time resolution is not possible with the CCD camera, but a pre-dose is relatively small and does not raise any problem in a case where the high dose is measured, and therefore time-resolved measurement is not required.

Moreover, II camera (640×480 pixels, etc.) is used in a case where the low dose is also included. Because the time-resolved measurement is required to remove the pre-dose with the low dose (time resolution is possible with the II camera). It is to be noted that time-resolved measurement is basically similar to the technique described in Jpn. Pat. Appln. KOKOKU Publication Nos. 4-77274 and 4-78144.

When the size of the fluorescence glass element is large for the two-dimensional camera 3, and the distribution needs to be measured over details or even the low dose is measured, the fluorescence glass element may be divided into a plurality of screens, read, and synthesized. Conversely, when the resolution is not required down to the number of pixels of the two-dimensional camera 3, it is possible to combine a plurality of pixels by bining and to process them as an output corresponding to a pixel. Bining means indicates the handling of 2×2 pixels or 4×4 pixels as one pixel, and "pixel division" described in the claims indicates a group of pixels processed in this manner.

The image processing device 4 measures the fluorescence intensity for each pixel division in the two-dimensional camera to perform predetermined data processing, and the display device 5 displays/outputs the dose and dose distribution for each pixel division.

(1-2) Constitution of Image Processing Device

The image processing device 4 for use in the present embodiment is constituted as shown in FIG. 2. That is, in the image processing device 4, an image data reception section 41 which receives image data from the two-dimensional camera 3, a data processing section 42 which performs predetermined data processing, a data storage section 43, and a processed data output section 44 which processes the processed data in the display device are disposed.

Moreover, in the data processing section 42, a pixel division setting section 421 which combines a plurality of pixels to handle them as a pixel division, a fluorescence intensity measurement section 422 which measures fluorescence intensity for each pixel division, a dose calculation section 423 which calculates the dose for each pixel division, a dose distribution preparation section 424 which prepares the two-dimensional dose distribution, and a three-dimensional data preparation section 425 which prepares three-dimensional data based on a plurality of two-dimensional dose are provided.

(1-3) Reading Method and Operation of Reader

Next, a dose distribution reading method for a glass dosimeter according to the first embodiment, and an operation of a reader will be described. First, as shown in FIG. 1, a reference glass dosimeter (not shown) reference-irradiated with radiation, and the glass dosimeter 1 which is a measurement object are prepared, an exciting ultraviolet ray is applied to the respective components from the ultraviolet exciting light source 2, a generated fluorescence is taken into the two-dimensional camera 3, and a fluorescence image is obtained with the two-dimensional camera 3. The image data is taken into the image processing device 4 to measure the fluorescence intensity for each preset pixel division (fluorescence intensity measurement step).

It is to be noted that a fluorescence generated amount per pixel is low, therefore the exciting light is applied for a certain time (e.g., about 10 seconds) in the measurement of the fluorescence intensity, and the fluorescence generated for this time is received to read charges stored in the two-dimensional camera 3. The application of the exciting ultraviolet ray to the glass fluorescence element or the measurement of the fluorescence intensity are performed under a dark environment (in a housing constituting a dark box).

Moreover, the fluorescence intensity measured for each pixel division is converted to a dose. Concretely, a ratio of the intensity of the reference glass dosimeter reference-irradiated with the radiation to that of the glass dosimeter 1, which is the measurement object, is obtained to calculate the dose in each pixel division. Subsequently, the dose and dose distribution for each pixel division are displayed by the display device 5 (dose distribution output step).

It is to be noted that there are the following modes as display examples in the display device 5:

a: image display of a two-dimensional distribution in colors divided in accordance with the dose;

b: three-dimensional graph display of the two-dimensional distribution in accordance with a dose value;

c: graph display of the dose value of a specific section on a specific line;

d: spot dose value display of a mouse pointer indication position on a screen in which the image is displayed;

e: display of the dose value in each spot of the two-dimensional distribution in a matrix form;

f: area display of a specific dose region;

g: display of a maximum or minimum value of the dose and a position of the value; and h: display of a central position of an irradiation region and the dose value in a case where the region is a circular spot.

Moreover, during the display, noise reducing processes such as gauss filtering and fast Fourier transform (FFT) may also be performed.

(1-4) Function/Effect

According to the above-described first embodiment, the two-dimensional dose and dose distribution of the glass dosimeter can be simultaneously read by the use of the two-dimensional camera 3. Therefore, the irradiation position and quantity of radiation can be confirmed with the high precision, and the embodiment can contribute greatly to the enhancement of the reliability of radiation therapy. Further in the first embodiment, since the exciting ultraviolet ray is applied from the fluorescence detection surface side of the fluorescence glass element, and the reading is performed with the two-dimensional camera disposed in a direction crossing the surface at right angles, an optical system for maintaining the exciting light parallel is not required, thus the constitution can be easily simplified.

(2) Second Embodiment

Figure 3:
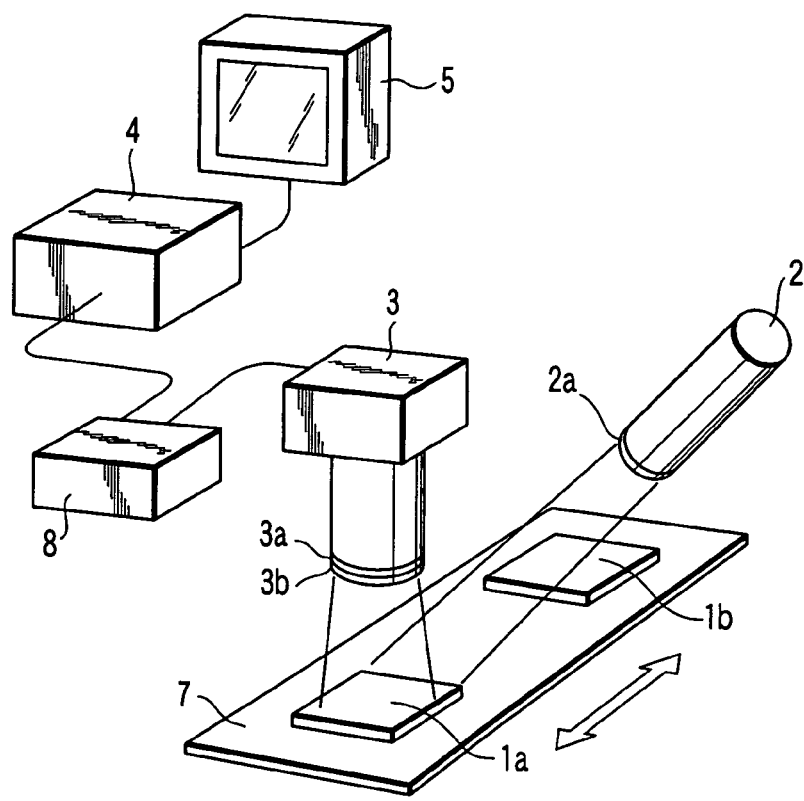
FIG. 3 is a diagram showing an apparatus constitution of a second embodiment according to the present invention.
Figure 4:
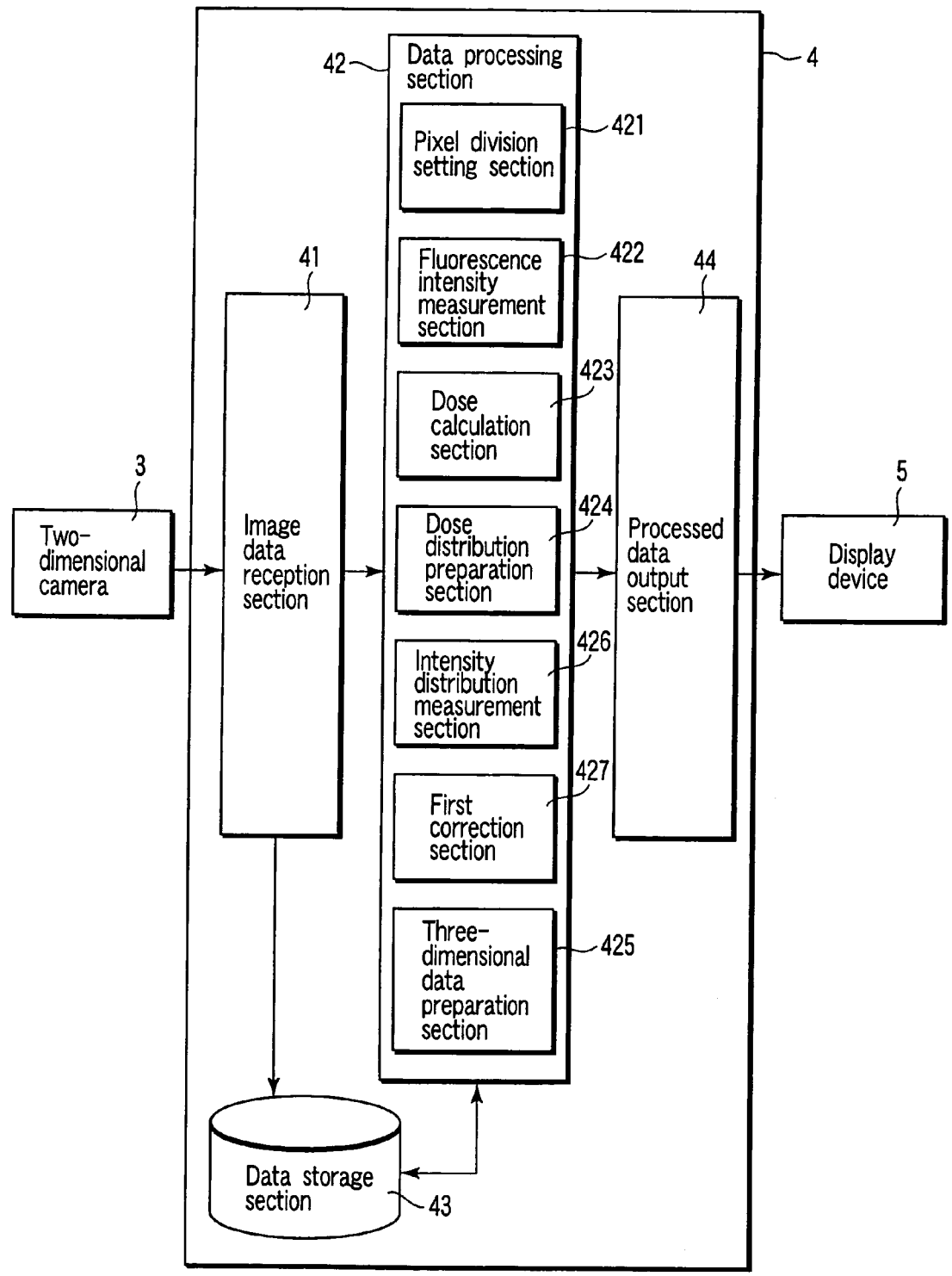
FIG. 4 is a functional block diagram showing the constitution of the image processing device of the second embodiment.

FIG. 3 is a diagram showing an example of an apparatus constitution of the present embodiment, and FIG. 4 is a functional block diagram showing the constitution of the image processing device 4 of the present embodiment.

(2-1) Apparatus Constitution

In FIG. 3, reference numeral 1a denotes a reference glass dosimeter reference-irradiated with radiation, and 1b denotes a glass dosimeter which is a measurement object. The reference glass dosimeter 1a is the whole fluorescence glass element reference-irradiated with γ rays such as $^{137}$Cs. These glass dosimeters 1a, 1b are laid on a glass conveyance table 7. The glass conveyance table 7 moves the glass dosimeters 1a, 1b directly under the two-dimensional camera 3. The two-dimensional camera 3 and image processing device 4 are electrically connected to a camera controller 8.

(2-2) Constitution of Image Processing Device

The image processing device 4 for use in the present embodiment is constituted as shown in FIG. 4. That is, in the data processing section shown in FIG. 2, an intensity distribution measurement section 426 which measures the intensity distribution of ultraviolet rays using the reference glass dosimeter whose fluorescence glass element is uniformly irradiated with the radiation, and a first correction section 427 to correct the dose and dose distribution for each pixel division of the glass dosimeter which is a measurement object are disposed. Since the other constitution is similar to that of the image processing device shown in FIG. 2, the description is omitted.

(2-3) Reading Method and Operation of Reader

Next, a dose distribution reading method and an operation of a reader for a glass dosimeter according to the second embodiment will be described. First, the reference glass dosimeter 1a, and the glass dosimeter 1 which is a measurement object are prepared, and the glass conveyance table 7 is moved. Accordingly, the exciting ultraviolet rays are applied from the ultraviolet exciting light source 2, the generated fluorescence is taken into the two-dimensional camera 3, and the fluorescence image is obtained by the two-dimensional camera 3. These image data are taken into the image processing device 4 to measure the fluorescence intensity for each pixel division (fluorescence intensity measurement step).

Since the whole fluorescence glass element is uniformly irradiated with the γ ray in the reference glass dosimeter 1a, the intensity distribution obtained from the reference glass dosimeter 1a is an intensity distribution of the ultraviolet exciting light source 2 itself (ultraviolet intensity distribution measurement step). A ratio of the ultraviolet intensity distribution obtained from the reference glass dosimeter 1a to the distribution obtained from the glass dosimeter 1b which is a measurement object is obtained to obtain the influence on the intensity distribution of the ultraviolet exciting light source 2. Moreover, the image processing device 4 corrects the dose and dose distribution in the glass dosimeter 1*b* in order to remove this influence (first correction step). Subsequently, the fluorescence intensity corrected for each pixel division is converted to the dose (dose conversion step), and the ratio of the intensity of the reference glass dosimeter 1*a* to that of the glass dosimeter 1*b* which is the measurement object is obtained to calculate the dose in each pixel division. Finally, the display device 5 displays the dose and dose distribution for each pixel division (dose distribution output step).

(2-3) Function/Effect

In the above-described second embodiment, the intensity distribution of the ultraviolet exciting light source 2 is obtained using the reference glass dosimeter 1*a*, and the dose and dose distribution in the glass dosimeter 1*b* which is the measurement object can be correction based on the intensity distribution. That is, the intensity distribution of the exciting light source 2 which influences two-dimensional distribution measurement itself is corrected to remove fluctuations of the exciting light in each pixel division of the glass dosimeter 1*b*, and accordingly the fluorescence intensity can be measured more correctly. According to the second embodiment, since the dose and dose distribution of the glass dosimeter 1*b* can be read with higher precision, there is an effect that the reliability is further enhanced.

Furthermore, in the second embodiment shown in FIG. 3, the reference glass dosimeter 1*a* and the glass dosimeter 1*b* which is the measurement object are replaced by the glass conveyance table 7, and the fluorescence intensity is measured only with the two-dimensional camera 3. Since the two-dimensional camera 3 is expensive, there is an advantage that economical burdens are reduced by the use of this constitution. Since the fluorescence intensity is measured by the same camera 3, the measurement can be stably performed without being influenced by a sensitivity difference between cameras.

Moreover, in the above-described embodiment, to read the intensity distribution of the exciting light, the fluorescence from the reference-irradiated reference glass dosimeter 1*a* is received without receiving the exciting light directly by the camera, and this is intended to offset dependency on temperature with respect to the generation of the fluorescence of the fluorescence glass element.

(3) Third Embodiment

Figure 6:
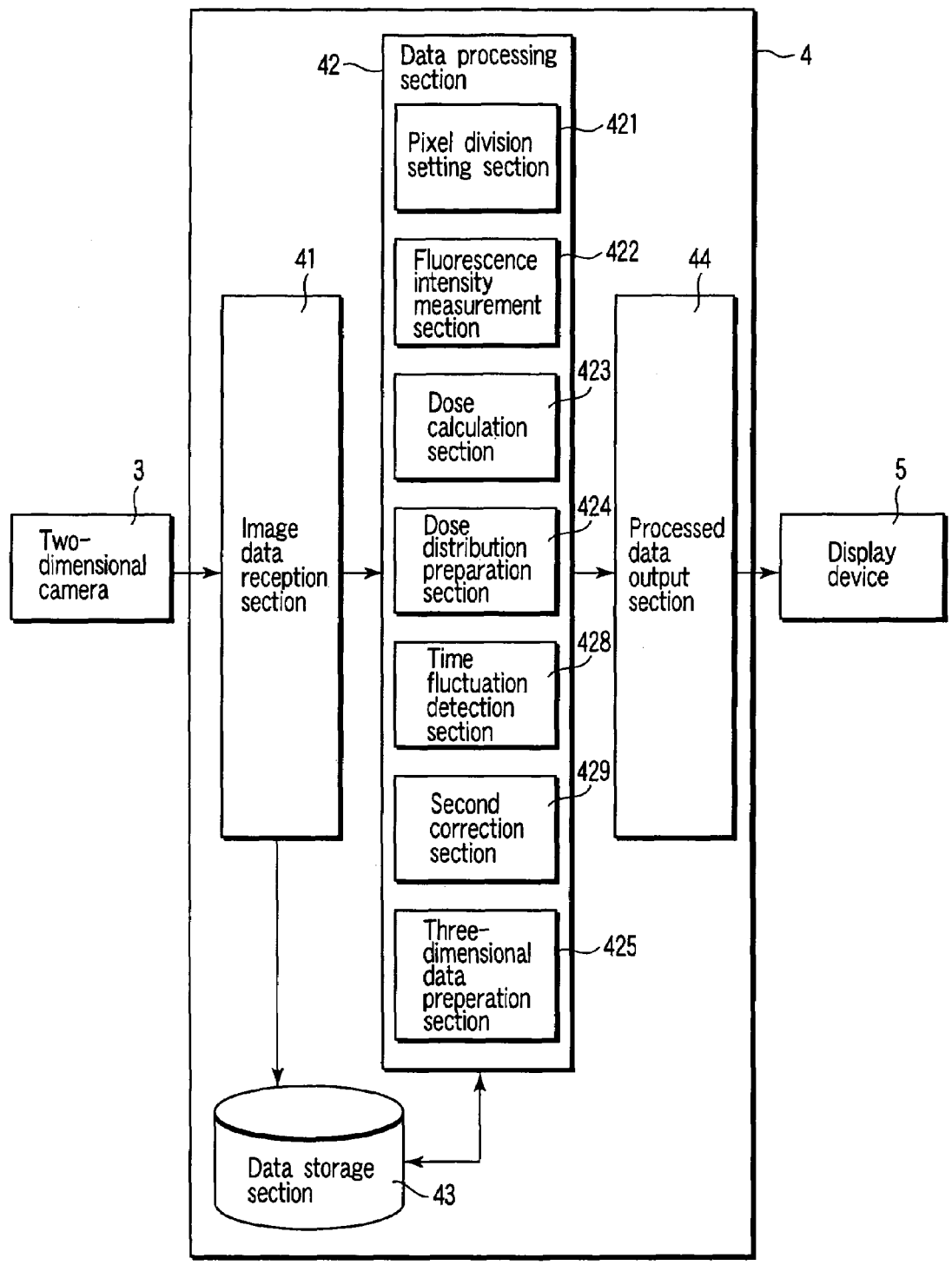
FIG. 6 is a functional block diagram showing the constitution of the image processing device of the third embodiment.

FIG. 5 is a diagram showing an example of an apparatus constitution of the present embodiment, and FIG. 6 is a functional block diagram showing the constitution of the image processing device 4 of the present embodiment.

(3-1) Apparatus Constitution

In FIG. 5, a quartz plate 12 is disposed in the vicinity of the glass dosimeter 1. The quartz plate 12 reflects a part of the exciting ultraviolet ray from the ultraviolet exciting light source 2. A lens 13 is disposed facing the quartz plate 12, and a high-dose irradiated glass dosimeter 9 is disposed in a portion to which light is sent from the lens 13. A photodiode 10 is disposed under the high-dose irradiated glass dosimeter 9, and the photodiode 10 is electrically connected to a preamplifier 11. Furthermore, the preamplifier 11 is electrically connected to the image processing device 4. The apparatus is constituted by these members to detect the fluctuations of the intensity of the ultraviolet exciting light with time.

(3-2) Constitution of Image Processing Device

The image processing device 4 for use in the present embodiment is constituted as shown in FIG. 6. That is, in the data processing section shown in FIG. 2, a time fluctuation detection section 428 which detects the fluctuation of the ultraviolet exciting light with time, and a second correction section 429 to correct the dose and dose distribution of the glass dosimeter which is the measurement object for each pixel division are disposed. Since the other constitution is similar to that of the image processing device shown in FIG. 2, the description is omitted.

(3-3) Reading Method and Operation of Reader

Next, a dose distribution reading method and an operation of a reader for a glass dosimeter according to the third embodiment will be described. First, the reference glass dosimeter 1*a* reference-irradiated with the radiation, and the glass dosimeter 1*b* which is the measurement object are prepared, and irradiated with the exciting ultraviolet rays from the ultraviolet exciting light source 2, and the generated fluorescence is taken into the two-dimensional camera 3 to obtain the fluorescence image in the two-dimensional camera 3. These image data are taken into the image processing device 4 and camera controller 8 to measure the fluorescence intensity for each pixel division (fluorescence intensity measurement step).

Moreover, simultaneously with the application of the ultraviolet rays from the ultraviolet exciting light source 2 with respect to the glass dosimeters 1*a*, 1*b*, the glass conveyance table 7 reflects a part of the ultraviolet radiation, and the lens 13 converges the radiation. Therefore, the radiation is applied to the high-dose irradiated glass dosimeter 9 to generate the fluorescence. The fluorescence generated in the high-dose irradiated glass dosimeter 9 is detected by the photodiode 10, and is converted to an electric signal by the preamplifier 11.

The image processing device 4 takes in the electric signal and image data. In this case, the image data from the reference glass dosimeter 1*a* is divided by the signal from the high-dose irradiated glass dosimeter 9 at a time when the image data of the reference glass dosimeter 1*a* is acquired, and accordingly the fluctuations of the exciting light of the ultraviolet exciting light source 2 with time are detected. On the other hand, the image data from the glass dosimeter 1*b* which is the measurement object is also divided by the signal from the high-dose irradiated glass dosimeter 9 at a time when the image data of the glass dosimeter 1*b* is acquired, and accordingly the fluctuations of the exciting light of the ultraviolet exciting light source 2 with time are detected (time fluctuation detection step).

Thereafter, a ratio of fluorescence intensity in the glass dosimeters 1*a*, 1*b* for each pixel division after the correction is obtained, and accordingly the image processing device 4 removes the influence of the detected time fluctuation from the dose and dose distribution for each pixel division (second correction step). Subsequently, the fluorescence intensity corrected for each pixel division is converted to a dose, the ratio of the intensity of the reference glass dosimeter 1*a* to that of the glass dosimeter 1*b* which is the measurement object is obtained to calculate the dose in each pixel division. Finally, the display device 5 displays the dose and dose distribution for each pixel division (dose distribution output step).

(3-4) Function/Effect

According to the above-described third embodiment, the fluctuations of the intensity of the ultraviolet exciting light from the ultraviolet exciting light source 2 with time is obtained, and the doses and dose distributions of the glass dosimeters 1*a*, 1*b* in each pixel division can be corrected to remove the influence. Therefore, measurement precisions of the dose and dose distribution for each pixel division are largely enhanced in the same manner as in the second embodiment.

(4) Fourth Embodiment (4-1) Constitution

In a fourth embodiment, as shown in FIG. 7, a glass dosimeter comprises a plurality of stacked thin glass plates $1c$, and this constitution is adapted in a case where the radiation is applied to the glass dosimeter, and comprises: fluorescence intensity measurement means for applying thin-layered ultraviolet rays to each thin glass plate to measure the fluorescence intensity of each of the thin glass plates $1c$ by the two-dimensional camera for each pixel division; measured value storage means for storing the measured value; and three-dimensional data output means for successively reading or synthesizing the stored measured values in a stacking order to output a three-dimensional dose and a three-dimensional dose distribution of the glass dosimeter, so that the three-dimensional dose and the three-dimensional dose distribution of the glass dosimeter are output. It is to be noted that the reading method and the operation of the reader and the function/effect are basically similar to those of the first to third embodiments.

(4-2) Reading Method and Operation of Reader

In the dose distribution reading method and the reader for the glass dosimeter according to the fourth embodiment, a side surface other than the fluorescence detection surface of the fluorescence glass element comprising a plurality of stacked thin glass plates $1c$ is irradiated with the thin-layered ultraviolet ray, and the fluorescence intensity from the fluorescence detection surface is measured for each of the thin glass plates $1c$ using the two-dimensional camera 3 (fluorescence intensity measurement step), and is stored as data for each thin glass plate $1c$. Moreover, the data obtained for each thin glass plate $1c$ is synthesized to output the three-dimensional dose and the three-dimensional dose distribution of the fluorescence glass element (three-dimensional data output step). It is to be noted that to read the stacked thin glass plates $1c$ in a separated state into each plate, the exciting ultraviolet rays may also be applied on the side of the fluorescence detection surface of the fluorescence glass element, as in the first embodiment shown in FIG. 1.

(4-3) Function/Effect

According to the fourth embodiment, the fluorescence intensity is measured for each of a plurality of stacked thin glass plates $1c$ using the two-dimensional camera 3, the dose is synthesized, and the three-dimensional dose and dose distribution can be read in the glass dosimeter 1. Therefore, the dose and dose distribution in the beam concentrated point and peripheral portion can be accurately grasped, the irradiation position and quantity of radiation can be correctly confirmed, and the reliability of the radiation therapy can be enhanced.

(5) Fifth Embodiment (5-1) Constitution

Figure 8:
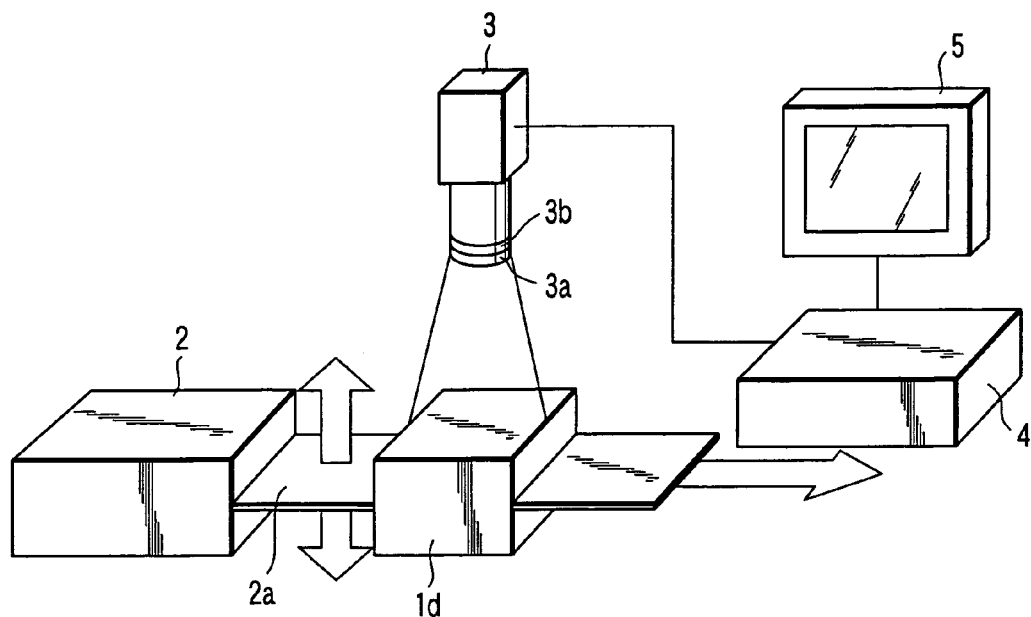
FIG. 8 is a diagram showing an apparatus constitution of a fifth embodiment according to the present invention.

As shown in FIG. 8, a fifth embodiment is constituted in such a manner that when a glass block $1d$ is used as the fluorescence glass element, and the ultraviolet ray shaped like a thin layer is applied to the glass block $1d$, the irradiation position is scanned in a vertical direction, and the fluorescence intensity in each irradiation position is successively measured. At this time, an exciting ultraviolet ray $2a$ shaped liked a thin layer is allowed to enter the glass block $1d$ via a slit sideways. It is to be noted that the reading method and the operation of the reader and the function/ effect are basically similar to those of the fourth embodiment.

(5-2) Function/Effect

According to the fifth embodiment, to apply the ultraviolet ray $2a$ shaped liked a thin layer in a thickness direction of the fluorescence glass element comprising the glass block $1d$, the incident position is successively changed in the vertical direction, the fluorescence intensity of each position is measured using the two-dimensional camera 3, and accordingly the three-dimensional dose and dose distribution in the glass dosimeter 1 can be read. Therefore, the dose and dose distribution in the beam concentrated point and peripheral portion can be accurately obtained, the irradiation position and quantity of radiation can be correctly confirmed, and the reliability of the radiation therapy can be enhanced.

(6) Sixth Embodiment (6-1) Constitution

A sixth embodiment comprises a sliding mechanism which moves the fluorescence glass element in the fourth or fifth embodiment in the vertical direction, and has a function in which the sliding mechanism is operated to move the fluorescence glass element when the ultraviolet exciting beam incident position is changed. It is to be noted that a known driving mechanism is usable in driving the sliding mechanism, and the ultraviolet exciting beam incident position with respect to the fluorescence glass element may be changed every predetermined pitch.

(6-2) Function/Effect

According to the sixth embodiment, when the incident position of the ultraviolet rays emitted from the ultraviolet exciting light source 2 is changed, the fluorescence glass element is moved, and therefore a light path of the exciting ultraviolet rays does not move. Therefore, the light path can be inhibited from being vibrated. When the light path of the exciting ultraviolet rays does not change, a position where the fluorescence is generated does not change, and therefore it is not necessary to move the two-dimensional camera or to adjust a focal point. Therefore, the reading operation can be smoothly carried out, and stable measurement is possible. It is to be noted that a moving direction of the fluorescence glass element may also be a right/left direction, and a moving pitch may also be adjusted to the thickness of the thin glass plate or may be appropriately selected.

(7) Seventh Embodiment

A seventh embodiment relates to an example in which the present invention is applied to an intensity-modulated radiation therapy (IMRT). IMRT is a radiation therapy method capable of varying a radiation dose in a certain irradiation surface. In IMRT, it is necessary to concentrate the dose on a target capacity (PTV) and to minimize a difference between a dose set by a therapy plan for suppressing the dose onto an important organ (OAR) disposed in the vicinity to an allowable or less level, and an actually applied dose. At present, a film has been used in actual measurement/QA of the dose. However, although a relative distribution of doses is known with the film, it is difficult to correctly read the dose value, an upper-limit dose is low, and it is difficult to measure accumulated doses. Since there are these and other problems, there has been a demand for a system capable of correctly measuring the dose values and distribution. A distribution dose measurement device of a diode system has a problem that the radiation dose cannot be read from the back surface.

Therefore, when the glass dosimeter of the present invention is applied even to IMRT, these problems can be solved, and the dose value and distribution can be correctly measured. Especially, since the dose onto peripheral organs need to be grasped in IMRT, the following advantages of the glass dosimeter are considered to be effective.

1. The dose value of the portion together with the distribution can be correctly measured, not the relative distribution.

Figure 9:
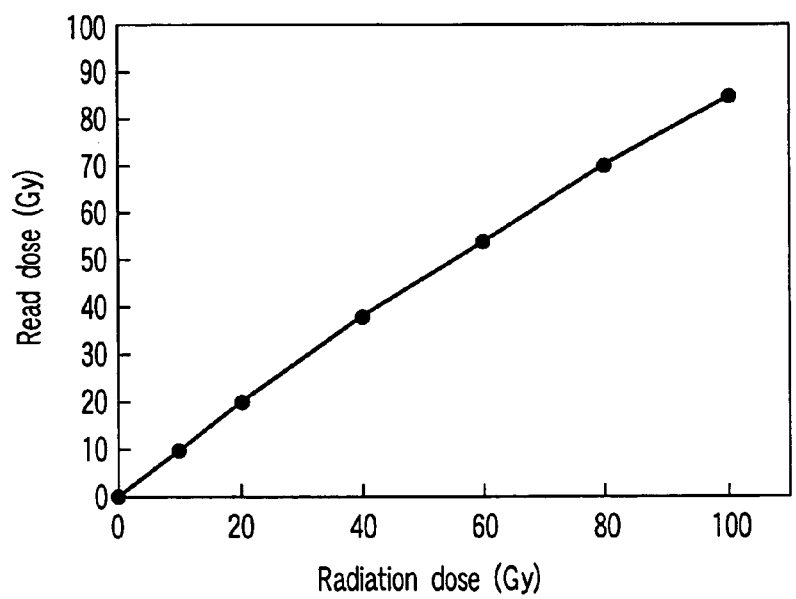
FIG. 9 is a diagram showing a sensitivity curve of the glass dosimeter of a seventh embodiment according to the present invention.

2. FIG. 9 is a diagram showing a sensitivity curve of the glass dosimeter according to the present embodiment, the abscissa indicates a radiation dose (Gy), and the ordinate indicates a read dose (Gy). FIG. 9 shows a case where a glass dosimeter having a thin plate shape (about 1 mm) is used. The dose can be linearly read up to about 20 Gy. At about 100 Gy, reading sensitivity slightly drops, but the dosimeter is capable of sufficiently measuring the dose in practical use. It is to be noted that the sensitivity drop in a high-dose range can be corrected, when sensitivity characteristics are known beforehand.

The dose can be usually measured only at about 7 Gy, or about 30 Gy at most with the film, but a high dose of 100 Gy or more can be measured using the glass dosimeter in this manner. In actual therapy, several tens of Gy are applied, and a dosimeter capable of measuring at least 50 Gy has been demanded.

3. After the irradiating/reading, additional irradiation is performed without annealing, and the accumulated doses can be read in the glass dosimeter.

4. The irradiations of not only the front surface but also the back surface can be measured.

5. The size of the glass plate is described as 100×100×1 mm at maximum in Japanese Patent Application No. 2002-256917, but 200×200× several millimeters is also possible, and it is possible to know the dose in a range including a peripheral organ.

(8) Other Embodiments

It is to be noted that the present invention is not limited to the above-described embodiments. For example, even when the two-dimensional distribution is measured in the glass dosimeter, as shown in FIG. 8, the exciting ultraviolet ray shaped like a thin layer may also be allowed to enter the dosimeter via the slit sideways. According to the embodiment, an exciting light section can be regulated by the slit. Therefore, even when the thickness of the glass element differs, a volume to be irradiated with the exciting light is always constant, and is not influenced by a working precision with respect to a glass thickness direction.

Moreover, when the intensity distribution of the exciting light source 2 is read, the exciting light may also be branched, so that two two-dimensional cameras may be used. In this case, the measurement by a reference radiation dosimeter may be performed simultaneously with that by a measurement object dosimeter. Therefore, the light source 2 has a merit that the source is not influenced by any time fluctuation (sensitivity difference between two two-dimensional cameras may also be measured beforehand and corrected).

Furthermore, the dimension of the constituting member can be appropriately changed, and for the measurement of the three-dimensional distribution, about three to five layers of thin glass plates are stacked if necessary, and an about 5 mm block is preferable. Since an irradiation error of a gamma or cyber knife is about 1 mm at most, it is possible to sufficiently capture the center of irradiation with this degree of thickness. It is to be noted that when the thin glass plates are stacked, the plates are not bonded to one another, and are superposed upon one another and buried in a phantom.

Furthermore, needless to say, the constitutions of the apparatuses described above in the respective embodiments may be combined and used.

INDUSTRIAL APPLICABILITY

According to a dose distribution reading method and a reader for a glass dosimeter of the present invention, by the use of a two-dimensional camera as a detector which detects fluorescence intensity from a fluorescence glass element, two-dimensional or three-dimensional dose and dose distribution of the glass dosimeter can be easily read, therefore it is confirmed with high precision whether or not a predetermined dose of radiation is applied to a predetermined position, and this can contribute to enhancement of reliability of radiation therapy.

What is claimed is:

1. A radiation dose reading method for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reading method for the glass dosimeter, comprising:
    using a two-dimensional camera as a detection unit which detects the fluorescence intensity from the fluorescence glass element;
    a fluorescence intensity measurement step of changing an incident position of the ultraviolet rays in a thickness direction of the fluorescence glass element to apply ultraviolet rays shaped like a thin layer from a side surface other than the fluorescence detection surface of the fluorescence glass element, and measuring the fluorescence intensity in each irradiation position for each pixel division using the two-dimensional camera; and
    a three-dimensional data output step of synthesizing a plurality of data measured by changing the incident position of the ultraviolet rays to output a three-dimensional dose and a three-dimensional dose distribution of the fluorescence glass element.

2. The dose distribution reading method for the glass dosimeter according to claim 1, wherein a glass block is used as the fluorescence glass element, and
    the fluorescence intensity measurement step comprises:
        scanning the ultraviolet rays shaped like a thin layer in a vertical direction with respect to the glass block to measure the fluorescence intensity of each irradiation position.

3. The dose distribution reading method for the glass dosimeter according to claim 1, wherein a plurality of stacked thin glass plates are used as the fluorescence glass element, and
    the fluorescence intensity measurement step comprises:
        applying the ultraviolet rays shaped like a thin layer to each of the thin glass plates to measure the fluorescence intensity of each thin glass plate.

4. The dose distribution reading method for the glass dosimeter according to claim 1, further comprising: moving the fluorescence glass element to change the incident position of the ultraviolet rays.

5. A radiation dose reading method for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reading method for the glass dosimeter, comprising:

using a two-dimensional camera as a detection unit which detects the fluorescence intensity from the fluorescence glass element;

using a plurality of stacked thin glass plates as the fluorescence glass element;

a fluorescence intensity measurement step of measuring the fluorescence intensity for each pixel division comprising a preset pixel or a plurality of pixels using the two-dimensional camera with respect to each of the thin glass plates;

a measured value storage step of storing a measured value of each thin glass plate; and a three-dimensional data output step of successively reading or synthesizing the stored measured values in a stacking order to output a three-dimensional dose and a three-dimensional dose distribution of the fluorescence glass element.

6. The dose distribution reading method for the glass dosimeter according to claim 1, further comprising:

an ultraviolet intensity distribution measurement step of reading an intensity distribution of the ultraviolet rays using a reference glass dosimeter whose fluorescence glass element is uniformly irradiated with radiation; and a first correction step of correcting the dose and the dose distribution of a glass dosimeter which is a measurement object for each pixel division based on the intensity distribution of the ultraviolet rays obtained from the reference glass dosimeter.

7. The dose distribution reading method for the glass dosimeter according to claim 1, further comprising:

a time fluctuation detection step of detecting a time fluctuation of intensity of the ultraviolet rays; and a second correction step of removing an influence of the detected time fluctuation from the dose and the dose distribution for each pixel division.

8. A radiation dose reader for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reader for the glass dosimeter, comprising:

a two-dimensional camera as a detection unit which detects the fluorescence intensity from the fluorescence glass element;

a fluorescence intensity measurement section which measures the fluorescence intensity for each pixel division comprising a preset pixel or a plurality of pixels;

a dose calculation section which converts the fluorescence intensity measured for each pixel division into the dose;

a dose distribution output section which outputs the dose and dose distribution for each pixel division;

a plurality of stacked thin glass plates which are used as the fluorescence glass element;

a measured value storage section which stores measured values of each of the thin glass plates; and a three-dimensional data output section which successively reads or synthesizes the stored measured values in a stacking order to output a three-dimensional dose and a three-dimensional dose distribution of the fluorescence glass element.

9. A radiation dose reader for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reader for the glass dosimeter, comprising:

a two-dimensional camera as a detection unit which detects the fluorescence intensity from the fluorescence glass element;

a fluorescence intensity measurement section which changes an incident position of the ultraviolet rays in a thickness direction of the fluorescence glass element to apply ultraviolet rays shaped like a thin layer from a side surface other than the fluorescence detection surface of the fluorescence glass element and which measures the fluorescence intensity in each irradiation position using the two-dimensional camera; and a three-dimensional data output section which synthesizes a plurality of data measured by changing the incident position of the ultraviolet rays to output a three-dimensional dose and a three-dimensional dose distribution of the fluorescence glass element.

10. The dose distribution reader for the glass dosimeter according to claim 9, further comprising: a sliding mechanism which moves the fluorescence glass element in a vertical direction or a right/left direction.

11. The dose distribution reader for the glass dosimeter according to claim 9, further comprising:

a reference glass dosimeter whose fluorescence glass element is uniformly irradiated with the radiation; and a correction section which corrects the dose and the dose distribution of a glass dosimeter which is a measurement object for each pixel division based on an intensity distribution of the ultraviolet rays obtained from the reference glass dosimeter.

12. The dose distribution reader for the glass dosimeter according to claim 9, further comprising:

a time fluctuation detection section which detects time fluctuation of intensity of the ultraviolet rays; and a second correction section which removes an influence of the time fluctuation detected in the time fluctuation detection section from the dose and the dose distribution for each pixel division.

13. A radiation dose reader for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reader for the glass dosimeter, comprising:

a plurality of stacked thin glass plates which are used as the fluorescence glass element;

a two-dimensional camera as a detection unit which detects the fluorescence intensity from the fluorescence glass element;

a fluorescence intensity measurement section which measures the fluorescence intensity for each pixel division comprising a preset pixel or a plurality of pixels;

a measured value storage section which stores measured values of each of the thin glass plates; and a three-dimensional data output section which successively reads or synthesizes the stored measured values in a stacking order to output a three-dimensional dose and a three-dimensional dose distribution of the fluorescence glass element.

14. The dose distribution reader for the glass dosimeter according to claim 13, further comprising: a sliding mechanism which moves the fluorescence glass element in a vertical direction or a right/left direction.

15. The dose distribution reader for the glass dosimeter according to claim 13, further comprising:

a reference glass dosimeter whose fluorescence glass element is uniformly irradiated with the radiation; and a correction section which corrects the dose and the dose distribution of a glass dosimeter which is a measurement object for each pixel division based on an intensity distribution of the ultraviolet rays obtained from the reference glass dosimeter.

16. The dose distribution reader for the glass dosimeter according to claim 13, further comprising:

a time fluctuation detection section which detects time fluctuation of intensity of the ultraviolet rays; and a second correction section which removes an influence of the time fluctuation detected in the time fluctuation detection section from the dose and the dose distribution for each pixel division.

17. A radiation dose reader for a glass dosimeter, in which a fluorescence glass element irradiated with radiation is excited by ultraviolet rays to read a radiation dose by a fluorescence intensity generated from a fluorescence detection surface of the fluorescence glass element, the dose distribution reader for the glass dosimeter, comprising:

a plurality of stacked thin glass plates which are used as the fluorescence glass element;

a two-dimensional camera as a detection unit which detects the fluorescence intensity from the fluorescence glass element;

a fluorescence intensity measurement section which measures the fluorescence intensity for each pixel division comprising a preset pixel or a plurality of pixels;

a dose calculation section which converts the fluorescence intensity measured for each pixel division into the dose;

a measured value storage section which stores measured values of each of the thin glass plates or the dose calculated by the dose calculation section; and a three-dimensional data output section which successively reads or synthesizes the stored measured values or the dose calculated by the dose calculation section in a stacking order to output a three-dimensional dose and a three-dimensional dose distribution of the fluorescence glass element.

18. The dose distribution reader for the glass dosimeter according to claim 17, further comprising: a sliding mechanism which moves the fluorescence glass element in a vertical direction or a right/left direction.

19. The dose distribution reader for the glass dosimeter according to claim 17, further comprising:

a reference glass dosimeter whose fluorescence glass element is uniformly irradiated with the radiation; and a correction section which corrects the dose and the dose distribution of a glass dosimeter which is a measurement object for each pixel division based on an intensity distribution of the ultraviolet rays obtained from the reference glass dosimeter.

20. The dose distribution reader for the glass dosimeter according to claim 17, further comprising:

a time fluctuation detection section which detects time fluctuation of intensity of the ultraviolet rays; and a second correction section which removes an influence of the time fluctuation detected in the time fluctuation detection section from the dose and the dose distribution for each pixel division.

* * * * *